(12) United States Patent
Khan et al.

(10) Patent No.: US 6,628,481 B1
(45) Date of Patent: Sep. 30, 2003

(54) LOAD BEAM OPENING-MOUNTED CHIP ON SUSPENSION

(75) Inventors: Amanullah Khan, Temecula, CA (US); Warren Coon, Temecula, CA (US)

(73) Assignee: Magnecorp Corp., Temecula, CA (US)

( * ) Notice: Subject to any disclaimer, the term of this patent is extended or adjusted under 35 U.S.C. 154(b) by 0 days.

(21) Appl. No.: 09/863,664

(22) Filed: May 18, 2001

Related U.S. Application Data

(62) Division of application No. 09/336,503, filed on Jun. 18, 1999.
(60) Provisional application No. 60/132,613, filed on Jun. 5, 1999.

(51) Int. Cl.⁷ .................................. G11B 5/60
(52) U.S. Cl. .................................. 360/244.1
(58) Field of Search ....................... 360/244.1, 244.9, 360/245.9; 29/603.03

(56) References Cited

U.S. PATENT DOCUMENTS 6,014,289 A * 1/2000 Goss ........................ 360/104

* cited by examiner

*Primary Examiner*—Robert S. Tupper
(74) *Attorney, Agent, or Firm*—Louis J Bachand

(57) ABSTRACT

A protective mounting for a microchip on a suspension is provided by locating the microchip in an opening in the load beam extending from the edge rail side through to the slider side and attaching the microchip there to a flexible circuit conductor extending on the slider side.

10 Claims, 2 Drawing Sheets

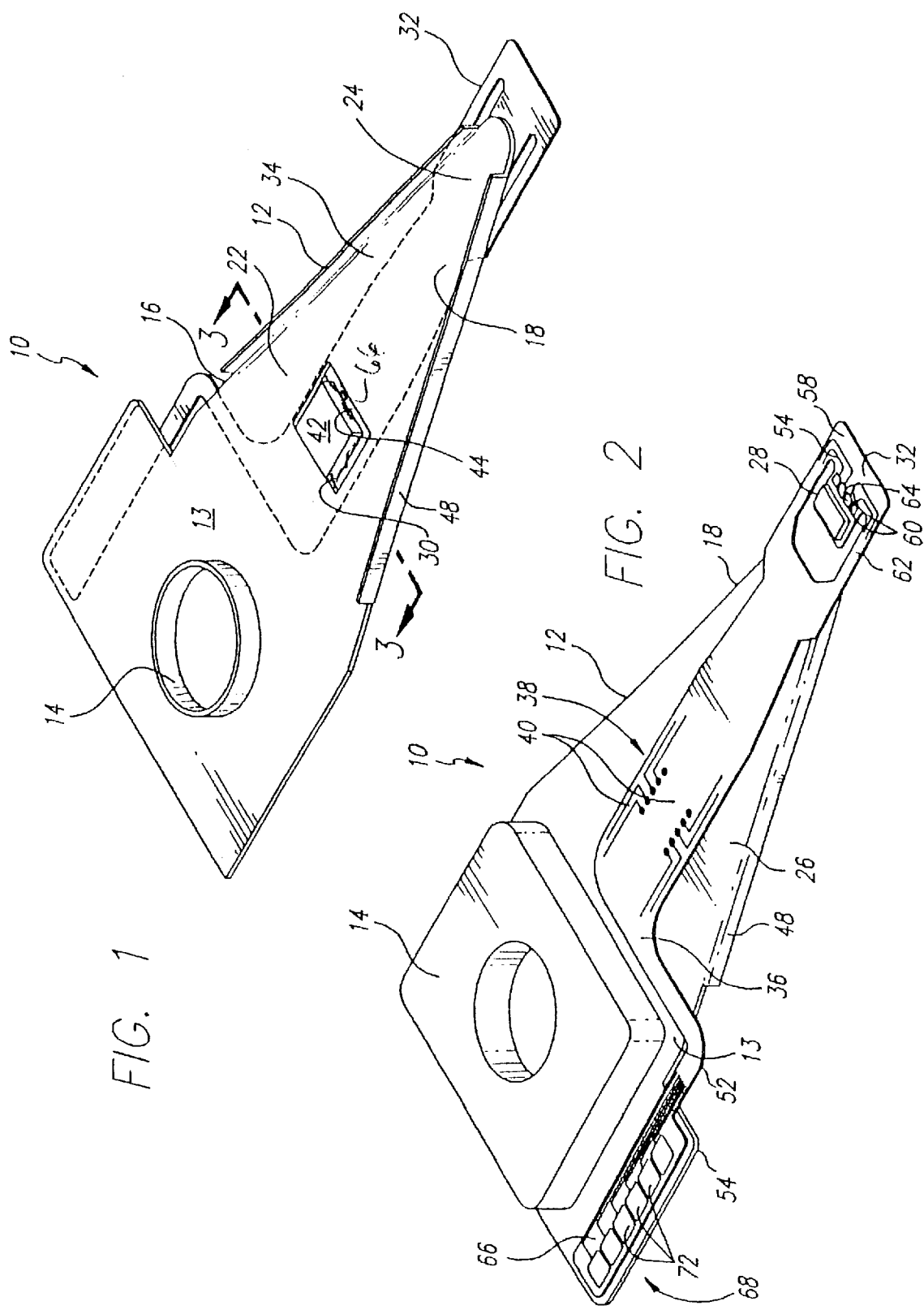

LOAD BEAM OPENING-MOUNTED CHIP ON SUSPENSION

REFERENCE TO RELATED APPLICATION

This application is a divisional application of my application Ser. No. 09/336,503 filed Jun. 18, 1999, which in turn claims the benefit of U.S. Provisional Application Serial No. 60/132,613 filed Jun. 5, 1999.

BACKGROUND OF THE INVENTION

1. Field of the Invention

This invention relates to disk drive suspensions, and more particularly to disk drive suspensions of the chip-on-suspension type where the preamp microchip signal processor is carried in the load beam rigid portion. The invention further relates to mounting the microchip in a lower profile, more spaced from the disk position within an opening in the suspension load beam rigid portion, where the microchip is supported against spurious vibration.

2. Related Art

The mounting of a disk drive recording head or slider (a term used herein to include both the recording head and the slider body in which the head is mounted) is typically at the distal end of the suspension. The suspension itself is mounted on an actuator arm. The preamp microchip has usually been located on the actuator because of overall performance and cost considerations, although this location may expose the costly chip to the possibility of being damaged during staking operations.

BRIEF SUMMARY OF THE INVENTION

As the signals being processed by the recording head increase in frequency and decrease in amplitude, however, the remoteness of the preamp microprocessor to the head becomes problematic, and so-called chip-on-suspension techniques are used to put the preamp microchip and recording head closer together to minimize ambient interferences with the signals.

Locating the microchip on the suspension is not without difficulties, however. Thus, mounting the preamp microchip at the far distal end of the suspension, adjacent the slider, leaves the microchip prone to damage from head slap resulting from lift-off and landing shocks. In addition, the heat radiating from the microchip can interfere with the thermally sensitive MR and GMR sliders. Windage interactions of the microchip are also negative factors, particularly since the fluid dynamics cross-section effect of the microchip is multiplied by the long moment arm between the microchip and the attachment point at the actuator.

Mounting the preamp microchip midway on the suspension at the rigid portion of the load beam offers potentially better shock and resonance performance. Use of the location, however, is constrained by the need to maintain minimum clearances in this area for combing operations (mechanical separation of the disks and load beams, e.g. in head stack assembly). Too little clearance chances damage to the disk since it is necessary to maintain a certain minimum strength (and thus size) in the combs to effectively lift the suspension from the disk. But the microchip is comparatively bulky in suspension terms.

It is accordingly an object of this invention to provide a disk drive suspension having the preamp microchip in the optimum location for high frequency, low amplitude signals, midway along the suspension, while avoiding the problems noted above. It is a further object to provide a disk drive suspension in which the microchip is mounted to the load beam rigid portion in such a way as to afford greater clearance from the disk for ease of combing operations. It is a still further object to provide a modified load beam for a disk drive suspension in which the preamp microchip is within the profile of the load beam rails against comb damage, and has a portion of its height within the load beam height rather than cumulative to the load beam height, and the flexible circuit conductor in the disk direction, thereby increasing the amount of space available for the combs to operate. It is another object to adhere the microchip to the load beam rather than to merely the flexible circuit conductor to reduce spurious vibrations found in an unsupported mass of the microchip on the conductor. Yet another object is to avoid having the microchip face the disk and risk contact of the microchip and the disk. A further object is to eliminate the windage problem noted above, by placing the microchip largely between the suspension edge rails. Another object is to facilitate high combing force, easy cleaning, and ready mergence of head and disk by increasing the disk-to-microchip spacing. The invention further has the object of facilitating automated attachment of the microchip onto the flexible circuit conductor or conductive traces by upward exposure of the contact points. It is a further object to provide a method of assembling disk drive suspensions having the advantages just noted.

These and other objects of the invention to become apparent hereinafter are realized in a disk drive suspension for supporting a slider in operating proximity to a disk, the suspension comprising a load beam having a base portion, a spring portion and a rigid portion, the load beam rigid portion having a first side proximate to the slider, a second side remote from the slider and a predetermined thickness between the first and second sides, a conductor defining a locus of electrical contact along the extent of the load beam rigid portion, and a signal-processing microchip extending through the rigid portion predetermined thickness, the microchip being electrically connected to the conductor at the electrical contact locus.

In this and like embodiments, typically, the load beam rigid portion has opposed edge rails on its remote side, the microchip being located between the edge rails, the microchip is generally polygonal, the load beam rigid portion having a microchip-receiving opening larger and generally congruent with the microchip, the opening extending through the rigid portion predetermined thickness, the conductor comprises a flexible circuit, the flexible circuit conductor is located on the rigid portion first side and defines the locus of electrical contact opposite the microchip, the flexible circuit conductor is supported by the load beam rigid portion and defines a flexure for supporting the slider, the flexible conductor supports the microchip in its load beam rigid portion received relation, the locus of electrical contact is a center locus, the flexible circuit also defining a proximate locus of electrical contact at the load beam base portion, and a distal locus of electrical contact at the slider for coupling the microchip to the slider and to electrical contact pads at the base portion, and/or the microchip is adhesively attached to the load beam rigid portion.

In a preferred embodiment, the invention provides a disk drive suspension for supporting a slider in operating proximity to a disk, the suspension comprising a stainless steel load beam having a base portion, a spring portion and a rigid portion, a slider mounted on a first side of the rigid portion, and a microchip mounted on a second side of the rigid portion.

In this and like embodiments, typically, the load beam rigid portion defines a microchip receiving opening, the microchip being adhesively bonded in the opening, the microchip has a given height, the height being such that the microchip is not fully received within the load beam rigid portion opening and has a projecting section beyond the rigid portion second side, the rigid portion second side having edge rails on opposite sides of the microchip, the microchip projecting section projecting from the rigid portion second side no higher than the edge rails, the microchip is generally polygonal, the load beam rigid portion having a microchip-receiving opening larger and generally congruent with the microchip, the opening extending through the thickness of the rigid portion, the suspension further comprises a conductor extending along the load beam rigid portion first side, the conductor comprises a flexible circuit having conductive traces and dielectric plastic laminated to a steel layer, the flexible circuit conductor being attached to the load beam rigid portion, the flexible circuit conductor is located on the rigid portion first side and defines a locus of electrical contact opposite the microchip, the flexible circuit conductor defines a flexure supporting the slider, the flexible conductor supports the microchip in its load beam rigid portion received relation, the conductor defines a locus of electrical contact for electrical connection of the conductor to the microchip, the suspension further includes electrical contact pads at the load beam base portion and at the slider, and in which the conductor locus of electrical contact is a center locus, the flexible circuit also defining a proximate locus of electrical contact at the load beam base portion, and a distal locus of electrical contact at the slider for coupling the microchip to electrical contact pads at the slider and to electrical contact pads at the base portion, and/or the microchip is adhesively attached to the load beam rigid portion.

In a particularly preferred embodiment, the invention provides a disk drive suspension supporting a slider in operating proximity to a disk, the suspension comprising an elongated load beam having in outward sequence a generally rectangular base portion mounted to an actuator with a mounting plate, a spring portion and an outwardly tapered rigid portion having a wider part adjacent the spring portion, the rigid portion wider part having an opening, and a narrower part adjacent the slider, and left and right edge rails terminating at the distal end of the load beam, the load beam rigid portion having a first side proximate to the slider and a second side remote from the slider and carrying the edge rails, a flexible circuit conductor fixed to the load beam rigid portion first side and comprising a dielectric layer, a plurality of conductive traces on the dielectric layer, a spring metal supporting layer, and a dielectric plastic cover over the conductive traces, the flexible circuit conductor defining a center locus of electrical contact comprising a plurality of contact pads located along the wider part of the load beam rigid portion, and a signal-processing microchip adhesively mounted within the rigid portion wider part opening, the microchip extending from the rigid portion second side through to the rigid portion first side portion, the microchip being electrically connected to the contact pads at the center locus; the flexible circuit defining a proximate locus of electrical contact comprising base portion electrical contact pads and a distal locus of electrical contact at the slider comprising slider electrical contact pads, and the flexible circuit spring metal layer defining a flexure support for the slider.

In its method aspects, the invention provides a method for assembling a disk drive suspension having a microchip mounted to its rigid portion and a flexible conductor extending along the rigid portion length, including forming a through opening in the rigid portion, mounting the microchip in the opening, and electrically connecting the microchip to the flexible conductor in its through opening-mounted condition.

BRIEF DESCRIPTION OF THE DRAWINGS

The invention will be further described in conjunction with the attached drawings in which:

FIG. 1 is an oblique view of the invention suspension, showing the non-slider or second side of the load beam rigid portion;

FIG. 2 is an oblique view of the invention suspension, showing the slider or first side of the load beam rigid portion; and, FIG. 3 is a longitudinal sectional view of the suspension taken on line 3—3 in FIG. 1.

DETAILED DESCRIPTION

Figure 3:
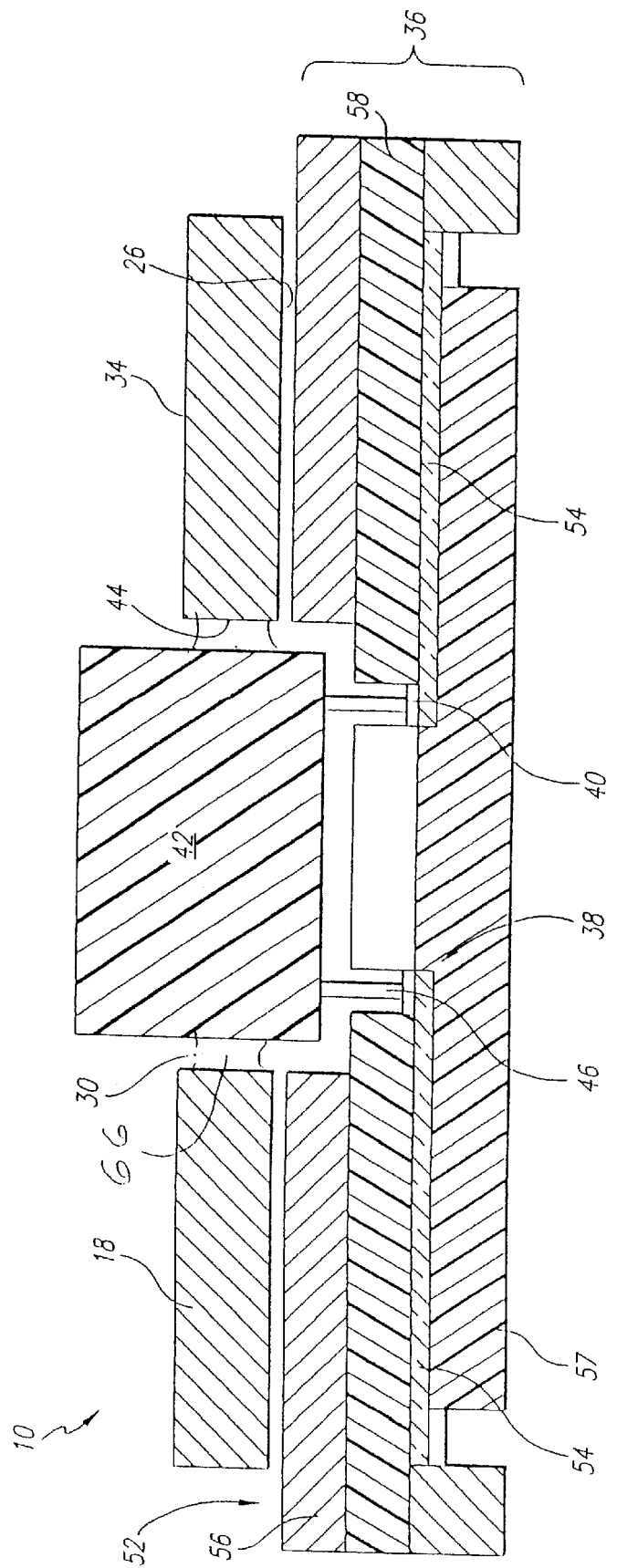

The invention provides a mounting locus for the preamp microchip in an opening in the load beam rigid portion such that the microchip extends into the opening and contacts the conductor on the slider side of the load beam preferably while being within the profile of, or lower in height than, the load beam edge rails. There is thus sufficient room for combing operations.

With reference now to the drawings in detail, in FIGS. 1, 2 and 3 the invention disk drive suspension is shown at 10 and comprises a load beam 12 having a base portion 13 supported on an actuator arm (not shown) by mounting plate 14, a spring portion 16, and an outwardly tapered rigid portion 18 having a wider part 22 and a narrower part 24. The load beam rigid portion 18 has a first side 26 proximate to the slider 28 that is carried on flexure 32 (FIG. 2). The load beam rigid portion 18 further has a second side 34 remote from the slider 28. Load beam rigid portion 18 has a predetermined thickness 30 between the first and second sides 26, 34. Suspension 10 has a conductor 36 that defines a locus of electrical contact 38 comprising a series of contact pads 40 along the longitudinal extent of the load beam rigid portion 18. A signal-processing microchip 42 extends through opening 44 through the load beam rigid portion predetermined thickness 30, and is electrically connected by its legs 46 to the conductive traces 54 at the electrical contact locus pads 40.

The load beam rigid portion 18 has the typical opposed edge rails 48 on its remote side 34, with the microchip 42 being located between the edge rails. Microchip 42 is shown as generally polygonal or square. The load beam rigid portion 18 has its opening 44 shaped and sized to be larger and generally congruent with the microchip 42, so as to bodily receive the microchip, as shown.

The conductor 36 preferably comprises a flexible circuit, that is a flexible conductive structure 52 known per se and comprised of a plurality of trace conductors 54 deposited or laminated onto a flexible plastic film forming a dielectric layer 58, covered with an insulative or dielectric coating 57, the traces and dielectric layer being supported on or laminated to a spring metal, e.g. stainless steel, layer 56. The flexible circuit conductor 36 is located on the load beam rigid portion 18 first side 26 and defines the mentioned locus of electrical contact 38 comprising electrical contact pads 40 opposite the microchip.

Flexible circuit conductor 36 is supported (by means not shown) by the load beam rigid portion 18. At its distal end 62, conductor 36 is reduced to its spring metal layer 56 in a known manner and shaped to define the flexure 32 that supports the slider 28. The conductive traces or trace conductors 54 at their distal ends 60 terminate at electrical contact pads 64 that are electrically coupled to the slider 28.

It is preferred to adhesively attach the microchip 42 in the load beam rigid portion opening 44. For this purpose, a suitable adhesive 66 such as a polymeric resin is used after the microchip is positioned in the opening. As mounted, the microchip extends little or not at all beyond the first side 26 of the load beam rigid portion, and projects beyond the rigid portion second side 34 usually no more than the height of the edge rails 48. The height of the microchip 42 is thus substantially taken up by the thickness 30 of the load beam rigid portion and the space beyond the rigid portion second side, so that there is little projection of the microchip 42 on the rigid portion first or slider side 26, or toward the disk 65, leaving room for combing operations.

Flexible circuit conductor 36 is used to support the microchip 42 in its load beam rigid portion opening 44 received relation, such that the microchip legs 46 connect with the electrical contact pads 40 in the central part of the suspension 10 at the wider part 22 of the load beam rigid portion 18.

The flexible circuit conductor 36 further defines at its proximate end 66 a proximate locus of electrical contact 68 at the load beam base portion 23 comprising a series of electrical contact pads 72.

The invention method assembles the disk drive suspension 10 having the microchip 42 mounted to its rigid portion 18 and a flexible conductor 36 extending along the rigid portion length, by forming a through opening 44 in the rigid portion, mounting the microchip 42 in the opening 44, and electrically connecting the microchip to contact pads 40 connected to the traces 54 of the flexible conductor via microchip legs 46 in its through opening-mounted condition.

The invention thus provides a disk drive suspension having a preamp microchip in the optimum location for high frequency, low amplitude signals, midway along the suspension, in such a way as to afford greater clearance from the disk for ease of combing operations. The preamp microchip is within the profile of the load beam rails against comb damage, and has a portion of its height within the load beam height rather than cumulative to the load beam height, and the flexible circuit conductor in the disk direction, thereby increasing the amount of space available for the combs to operate. The microchip is adhered to the load beam to reduce spurious vibrations found in an unsupported mass of the microchip on a conductor.

We claim:

1. A method for supporting for supporting a disk drive suspension slider in operating proximity to a disk, said suspension comprising a load beam having a base portion, a spring portion and a rigid portion, said load beam rigid portion having a first side proximate to said slider, a second side remote from said slider and a predetermined thickness between said first and second sides, said method including having a conductor define a locus of electrical contact along an extent of said load beam rigid portion, providing a signal-processing microchip extending through said rigid portion predetermined thickness, and electrically connecting said microchip to said conductor at said electrical contact locus.

2. The method according to claim 1, including also maintaining on said load beam rigid portion opposed edge rails on its remote side, and locating said microchip between said edge rails.

3. The method according to claim 1, including also providing as said microchip a microchip that is generally polygonal, forming said load beam rigid portion microchip-receiving opening to be larger and generally congruent with said microchip, and extending said opening through said rigid portion predetermined thickness.

4. The method according to claim 1, including also selecting as said conductor a conductor that comprises a flexible circuit.

5. The method according to claim 4, including also locating said flexible circuit conductor on said rigid portion first side and defining said locus of electrical contact opposite said microchip.

6. The method according to claim 5, including also supporting said flexible circuit conductor by said load beam rigid portion.

7. The method according to claim 6, including also supporting said microchip with said flexible conductor in its load beam rigid portion received relation.

8. The method according to claim 6, including also maintaining said locus of electrical contact as a center locus, defining with said flexible circuit a proximate locus of electrical contact at said load beam base portion and a distal locus of electrical contact at said slider, and coupling said microchip to said slider and to electrical contact pads at said base portion.

9. The method according to claim 8, including also adhesively attaching said microchip to said load beam rigid portion.

10. The method of supporting a suspension slider in operating proximity to a disk, including selecting a stainless steel load beam having a base portion, a spring portion and a rigid portion, mounting a slider on a first side of said rigid portion, mounting a microchip on a second side of said rigid portion, and electrically connecting said slider and said microchip.

* * * * *

UNITED STATES PATENT AND TRADEMARK OFFICE
CERTIFICATE OF CORRECTION

PATENT NO. : 6,628,481 B1
DATED : September 30, 2003
INVENTOR(S) : Amanullah Khan and Warren Coon It is certified that error appears in the above-identified patent and that said Letters Patent is hereby corrected as shown below:

<u>Title page,</u>
Item [73], Assignee, "Magnecorp Corp." should read -- Magnecomp Corp. --

Signed and Sealed this

Seventeenth Day of August, 2004

JON W. DUDAS
*Acting Director of the United States Patent and Trademark Office*